United States Patent
Swing, III

(10) Patent No.: US 12,031,581 B1
(45) Date of Patent: Jul. 9, 2024

(54) BEARING ASSEMBLY FOR ELECTRICAL SWITCH

(71) Applicant: Hubbell Incorporated, Shelton, CT (US)

(72) Inventor: Donald Fletcher Swing, III, Birmingham, AL (US)

(73) Assignee: Hubbell Incorporated, Shelton, CT (US)

(*) Notice: Subject to any disclaimer, the term of this patent is extended or adjusted under 35 U.S.C. 154(b) by 81 days.

(21) Appl. No.: 16/031,580

(22) Filed: Jul. 10, 2018

Related U.S. Application Data

(60) Provisional application No. 62/530,598, filed on Jul. 10, 2017.

(51) Int. Cl.
| | |
|---|---|
| *H01H 31/28* | (2006.01) |
| *F16C 33/38* | (2006.01) |
| *F16C 33/60* | (2006.01) |
| *F16C 35/07* | (2006.01) |
| *H01H 3/32* | (2006.01) |
| *H01H 9/00* | (2006.01) |

(52) U.S. Cl.
CPC ........ *F16C 33/605* (2013.01); *F16C 33/3806* (2013.01); *F16C 35/07* (2013.01); *H01H 3/32* (2013.01); *H01H 31/28* (2013.01); *H01H 2003/326* (2013.01); *H01H 2009/0094* (2013.01)

(58) Field of Classification Search
CPC ...... H01H 2003/326; H01H 2009/0094; F16C 33/605; F16C 33/3806; F16C 35/07
See application file for complete search history.

(56) References Cited

U.S. PATENT DOCUMENTS

| | | | | |
|---|---|---|---|---|
| 2,660,631 | A * | 11/1953 | Harrison | H01H 1/5833 200/48 SB |
| 3,005,063 | A * | 10/1961 | Zemels | H01H 31/28 200/48 SB |
| 3,649,094 | A * | 3/1972 | Russell | F16C 19/163 384/533 |
| 3,745,274 | A * | 7/1973 | Cole | H01H 31/30 200/48 CB |
| 6,927,355 | B2 * | 8/2005 | Thuresson | H01H 33/36 218/154 |
| 6,967,302 | B2 * | 11/2005 | Peter | F16D 41/22 192/66.1 |
| 8,371,759 | B2 * | 2/2013 | Fukuda | F16C 19/182 384/512 |
| 9,099,266 | B2 | 8/2015 | Rhein | |
| 9,127,716 | B2 * | 9/2015 | Kamamoto | F16C 33/416 |

(Continued)

FOREIGN PATENT DOCUMENTS

JP 2011043214 A * 3/2011 ............ F16C 19/163

Primary Examiner — Felix O Figueroa
(74) Attorney, Agent, or Firm — Robinson + Cole LLP

(57) ABSTRACT

A bearing assembly includes an inner race, an outer race, a cage, and a plurality of balls. The inner race is configured to be coupled to a shaft. The cage includes a body having a plurality of projections and a plurality of openings. The cage is positioned between the inner race and the outer race, and is constructed from a corrosion-resistant and gall-resistant material. Each of the plurality of balls is received in an associated one of the plurality of openings, and the plurality of balls is positioned between the inner race and the outer race.

20 Claims, 12 Drawing Sheets

(56) References Cited

U.S. PATENT DOCUMENTS

| | | | |
|---|---|---|---|
| 10,054,155 B2* | 8/2018 | Kamamoto | F16C 33/416 |
| 10,167,896 B2* | 1/2019 | Malychok | F16C 19/28 |
| 2019/0206643 A1* | 7/2019 | Boehm | H01H 11/00 |

* cited by examiner

BEARING ASSEMBLY FOR ELECTRICAL SWITCH

CROSS-REFERENCE TO RELATED APPLICATION

This application claims the benefit of prior-filed, U.S. Provisional Patent Application No. 62/530,598, filed Jul. 10, 2017, the entire contents of which are incorporate by reference herein.

BACKGROUND

The application relates to high-voltage electrical switches, and particularly to a bearing assembly for a high-voltage electric switch.

SUMMARY

In one independent aspect, a bearing assembly includes an inner race, an outer race, a cage, and a plurality of balls. The inner race is configured to be coupled to a shaft. The cage includes a body having a plurality of projections and a plurality of openings. The cage is positioned between the inner race and the outer race, and is constructed from a corrosion-resistant and gall-resistant material. Each of the plurality of balls is received in an associated one of the plurality of openings, and the plurality of balls is positioned between the inner race and the outer race.

In another independent aspect, a shaft assembly for a high-voltage electric switch includes a housing, a shaft extending at least partially through the housing, a first bearing assembly, and a second bearing assembly. The first and the second bearing assemblies are coupled to the shaft and support rotation of the shaft relative to the housing. Each of the first and the second bearing assemblies includes an inner race coupled to a shaft, an outer race, a cage, and a plurality of balls. The cage includes a body having a plurality of projections and a plurality of openings, and the cage is positioned between the inner race and the outer race. Each of the plurality of balls is received in an associated one of the plurality of openings, and the plurality of balls is positioned between the inner race and the outer race.

In yet another independent aspect, a high-voltage electric switch includes: a first electrical terminal configured to be supported on a frame member, a second electrical terminal configured to be supported on the frame member, a conducting member for providing electrical communication between the first electrical terminal and the second electrical terminal, and a shaft assembly supporting one of the first electrical terminal and the second electrical terminal for pivoting movement to move the conducting member between a first position and a second position. The conducting member providing electrical communication between the first electrical terminal and the second electrical terminal while the conducting member is in the first position, and electrical communication between the first electrical terminal and the second electrical terminal is interrupted while the conducting member is in the second position. The shaft assembly includes a housing, a shaft extending at least partially through the housing and coupled to the one of the first electrical terminal and the second electrical terminal, and a pair of bearing assemblies supporting rotation of the shaft relative to the housing. Each of the bearing assemblies includes: an inner race coupled to the shaft; an outer race; a cage including a body having a plurality of projections and a plurality of openings, the cage positioned between the inner race and the outer race; and a plurality of balls, each of the plurality of balls being received in an associated one of the plurality of openings, the plurality of balls positioned between the inner race and the outer race.

Other aspects of the shaft assembly will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Some high-voltage (for example, voltages at 362 kV and above) electrical switches operate by rotating one or more of the insulators on which the equipment is mounted, thus requiring a bearing assembly to facilitate that rotation. In addition to allowing rotation, the bearing must be capable of supporting the weight of the parts mounted on it as well as surviving common cantilever loading of the parts without affecting the switch's ability to operate satisfactorily. The bearings may contact each other frequently during operation which can cause galling if made of a soft alloy of steel.

Galling warps or changes the shape of the balls, releasing steel dust into the assembly and causing the bearing to grind or chatter in operation and potentially causing bearing failure. It is also necessary for the bearing to be able to withstand weather without rusting or any other sort of corrosion. In some cases, rust/corrosion can completely lock bearings such that an operator must force the switch(es) open with an external tool, which can be dangerous at high voltage.

Commercially-available stainless steel bearings are small in size and are not rated for the load requirements of high-voltage switches. Also, conventional bearings are not suitable for this application due to the infrequent, less-than-full-revolution operation. Many high-voltage switch bearings may be operated less than once every two years, and some are operated even less frequently. Even then the operation often only occurs over 90 degrees of rotation, thus complicating the ability to protect against corrosion for many of the moving parts.

Figure 1:
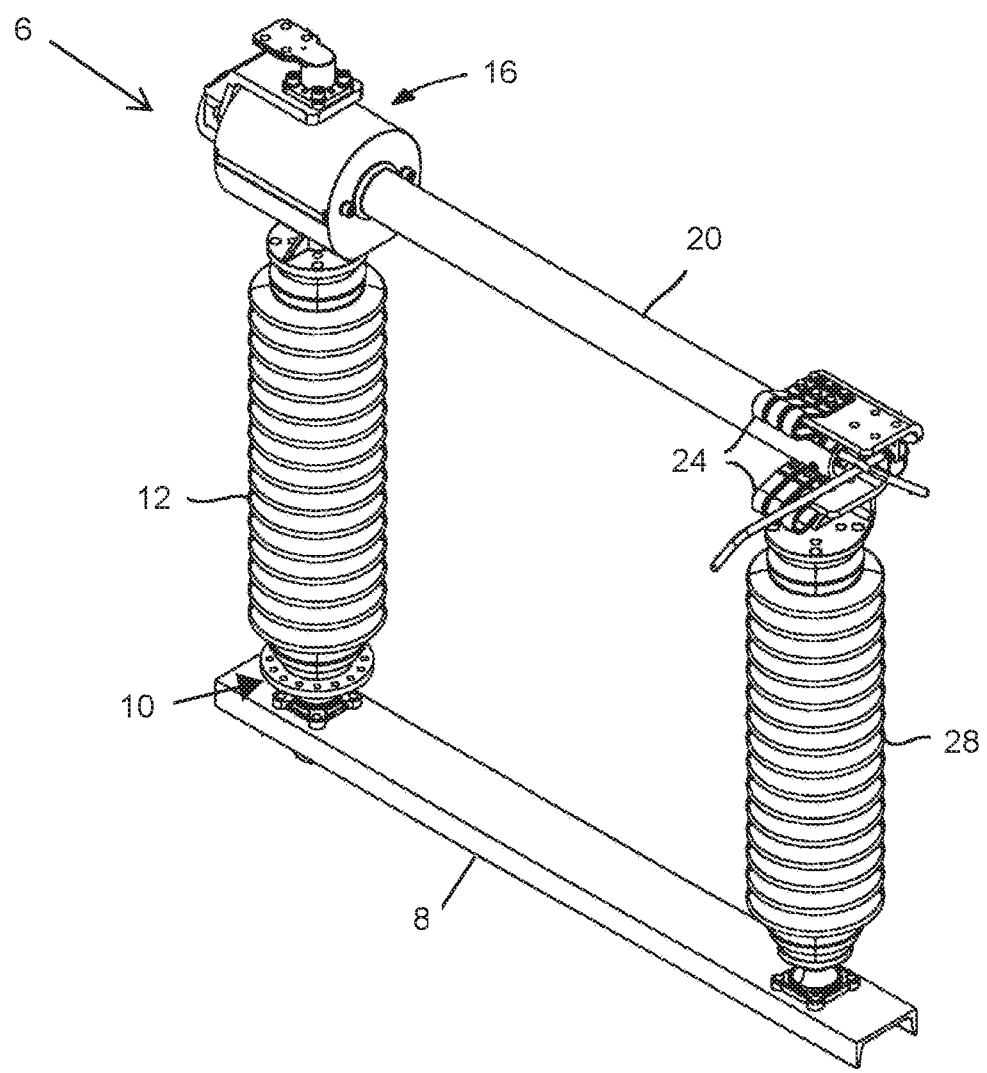
FIG. 1 is a perspective view of a high-voltage electrical switch in a closed state.
Figure 2:
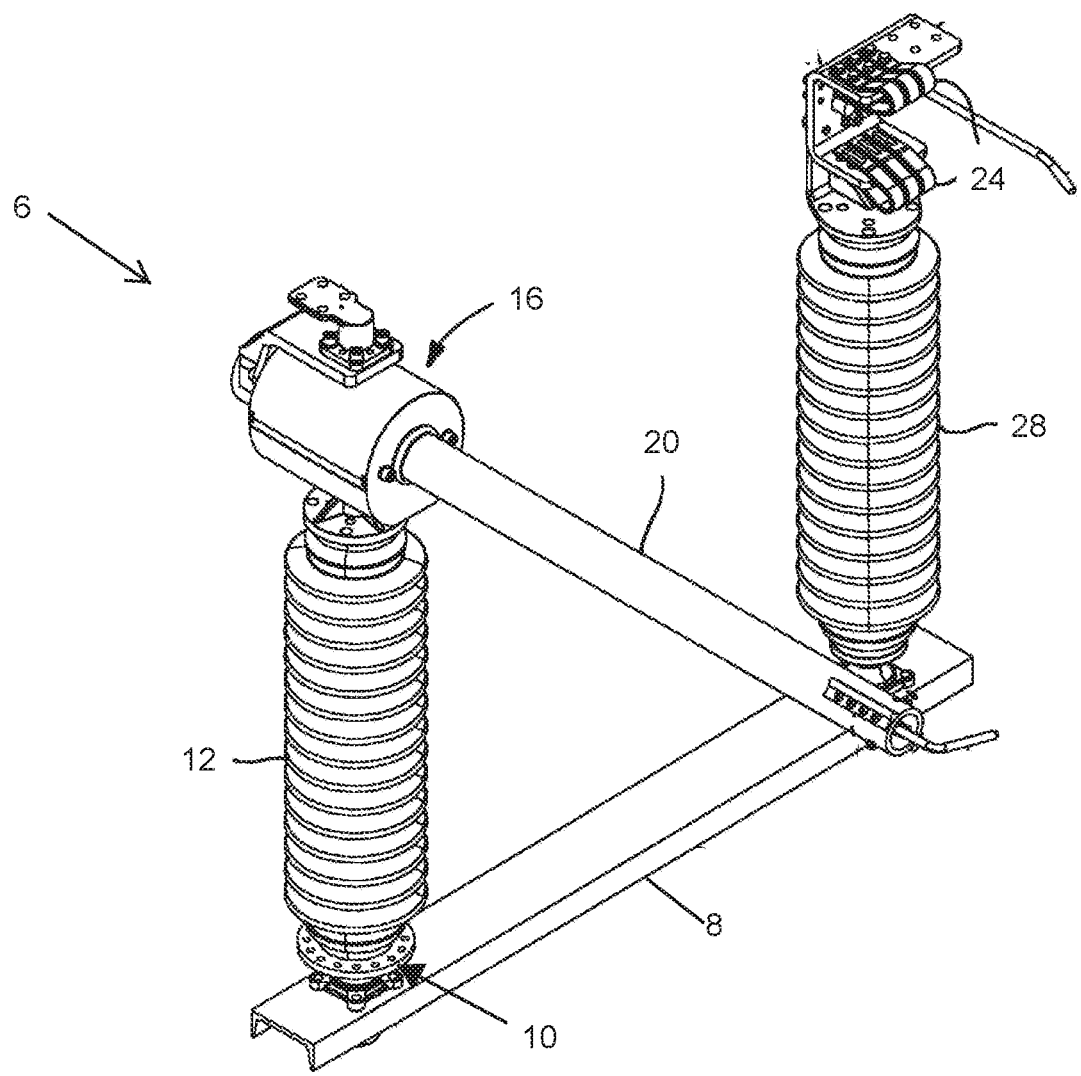
FIG. 2 is a perspective view of the high-voltage electrical switch in an open state.

FIGS. 1 and 2 depict a high-voltage electrical switch 6. In the illustrated embodiment, the electrical switch 6 is supported on a frame member 8 that may be connected to a utility structure (not shown). A shaft assembly 10 is connected to the frame member 8, and supports a first insulator 12 and a blade support 16 for pivoting movement relative to the frame member 8. The first insulator 12 is positioned between the shaft assembly 10 and the blade support 16. The blade support 16 is coupled to an electrically conductive blade 20, which can be selectively positioned to engage terminal contacts 24 positioned on top of a second insulator 28 to close the switch (FIG. 1). As shown in FIG. 2, the shaft assembly 10 permits the blade support 16 and blade 20 to pivot away from the terminal contacts 24 to open the switch.

Figure 3:
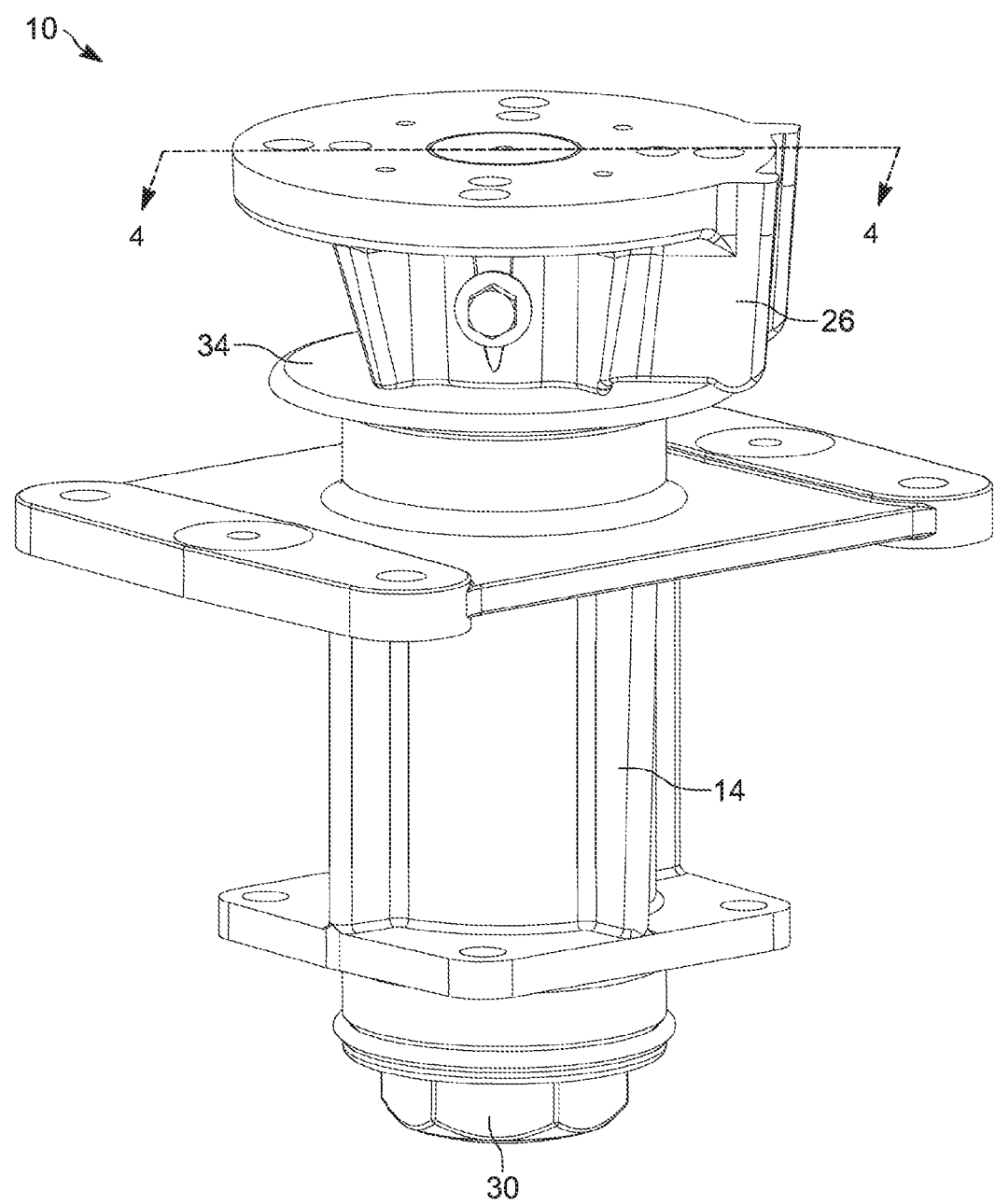
FIG. 3 is a perspective view of a shaft assembly.
Figure 4:
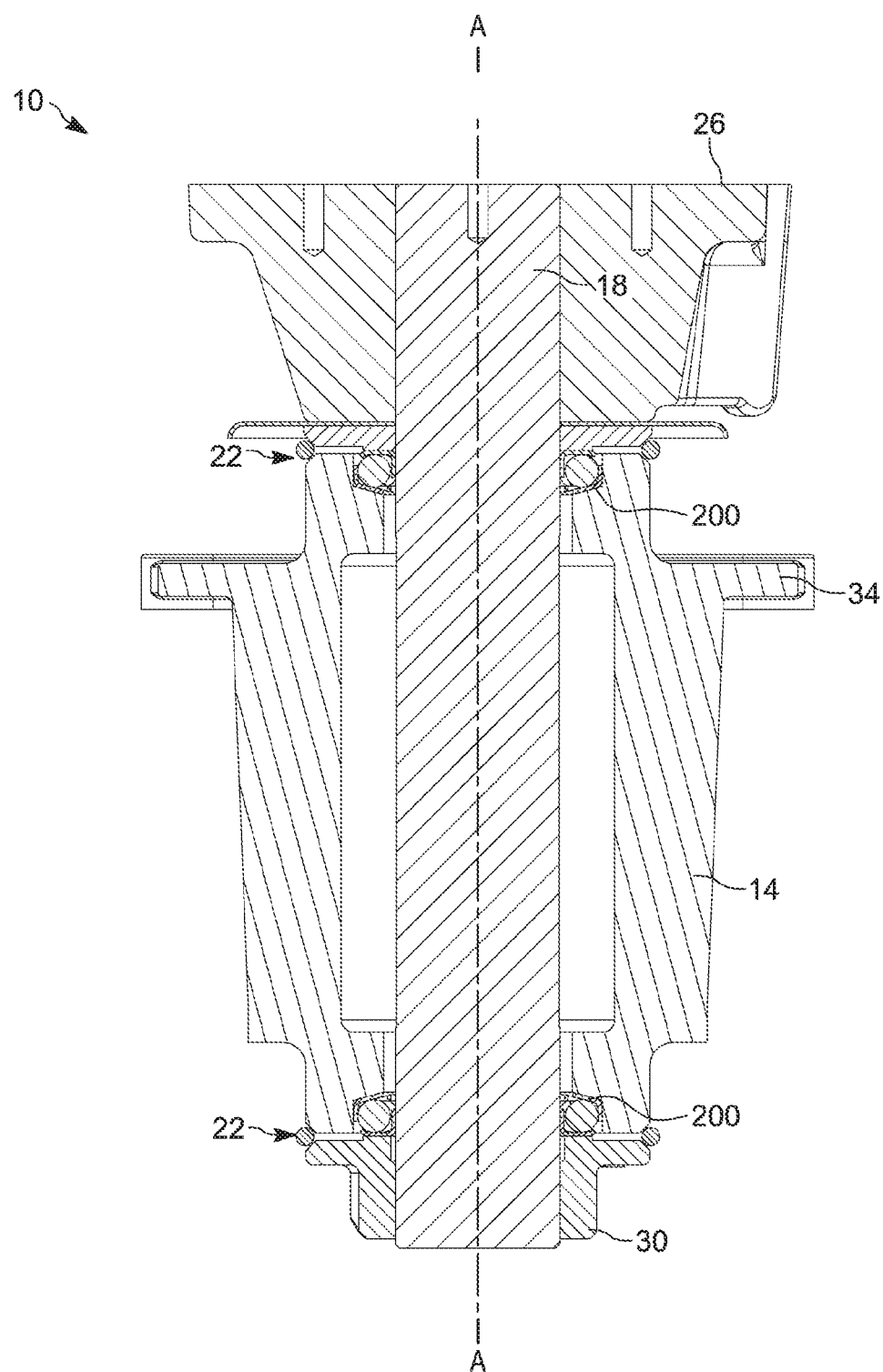
FIG. 4 is a cross-sectional view of the shaft assembly of FIG. 3, viewed along section 4-4.
Figure 5:
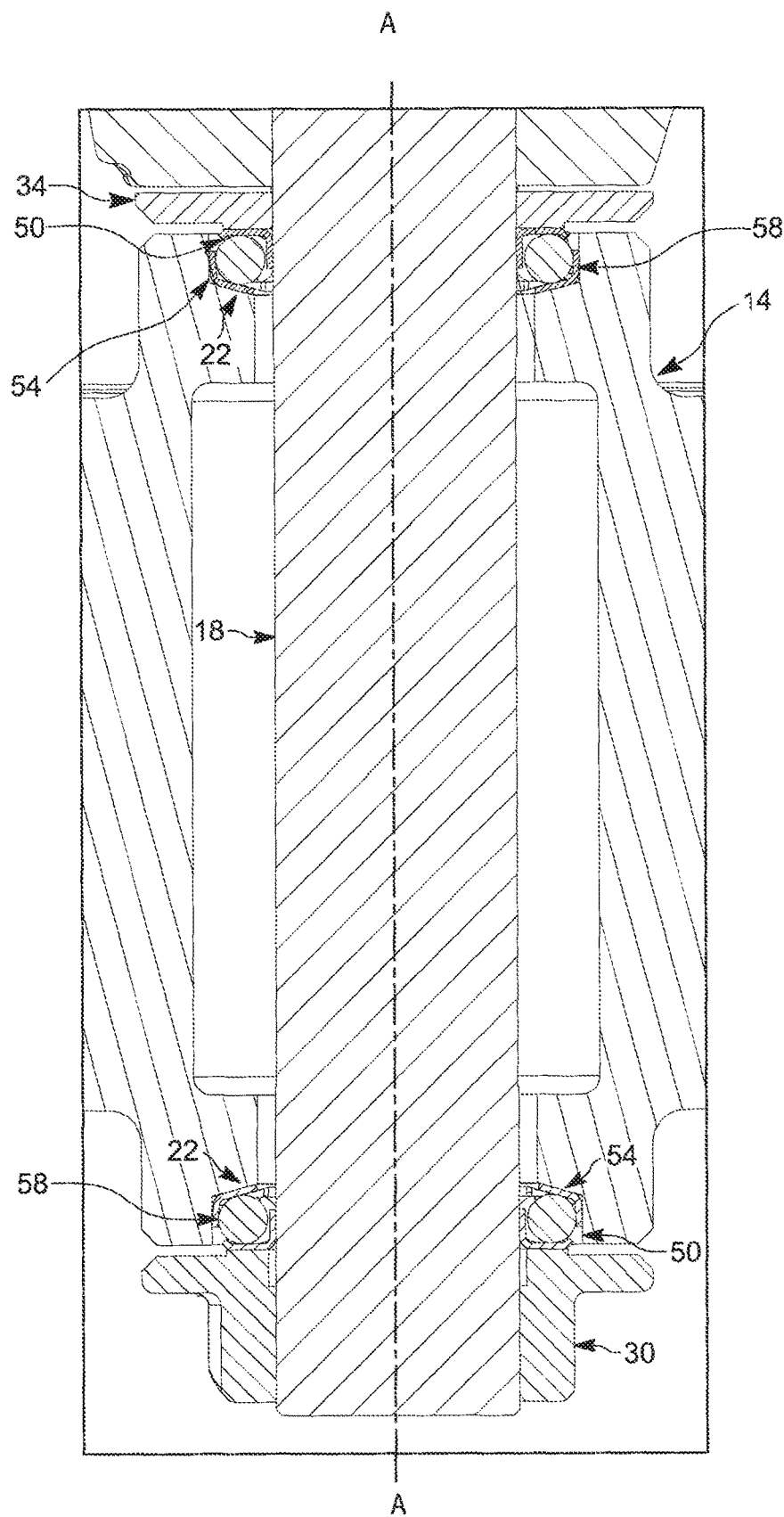
FIG. 5 is an enlarged view of a portion of the the shaft assembly of FIG. 3.

FIGS. 3 and 4 illustrate a shaft assembly 10 of a high-voltage electrical switch. The shaft assembly 10 includes a bearing housing 14, a shaft 18, first and second bearing assemblies 22, and support block 26. In the illustrated embodiment, the first insulator 12 is connected to the support block 26. The shaft 18 extends through the bearing housing 14, and the first and second bearing assemblies 22 are coupled to the shaft 18 on opposite sides of the bearing housing 14. The bearing assemblies 22 allow the shaft 18 to rotate about its longitudinal axis A (FIG. 4). In the illustrated embodiment, a nut 30 is positioned adjacent one of bearing assemblies 22 and a plate 34 (FIG. 3) is positioned adjacent the other of the bearing assemblies 22. The support block 26 is positioned adjacent the plate 34 and coupled to and rotatable with the shaft 18.

Figure 6:
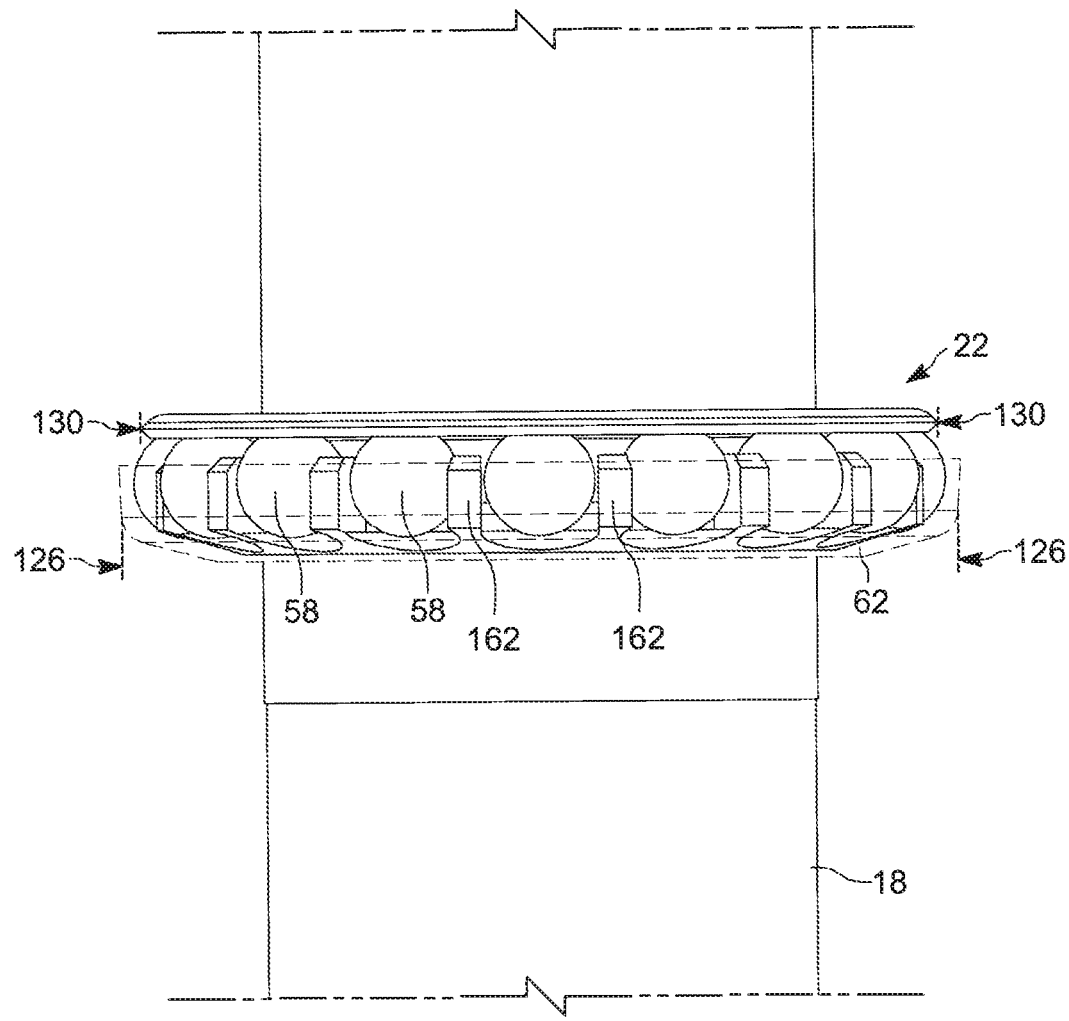
FIG. 6 is a side view of a bearing assembly.
Figure 7:
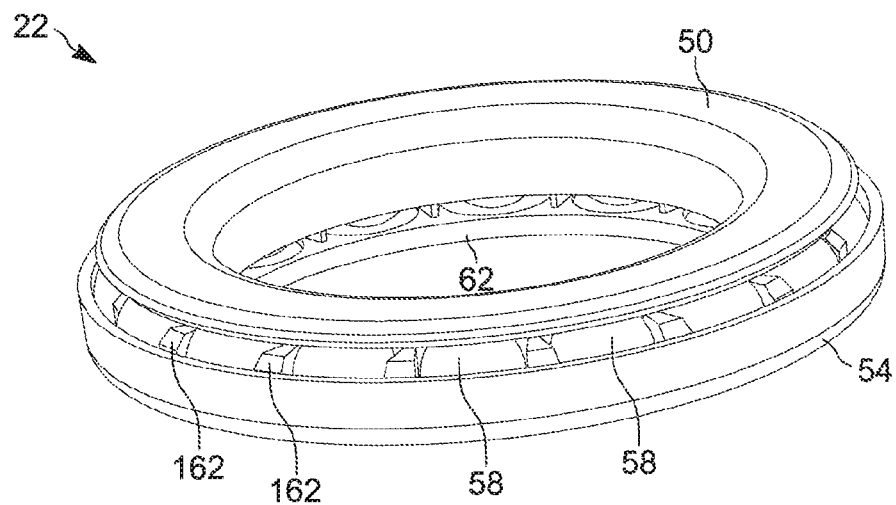
FIG. 7 is a perspective view of the bearing assembly of FIG. 6.
Figure 8:
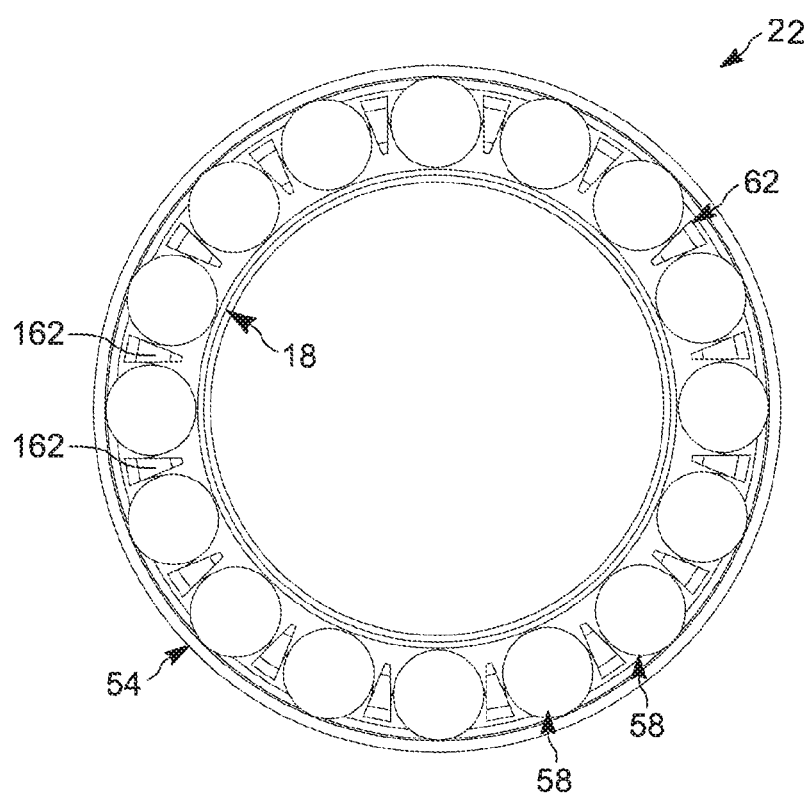
FIG. 8 is a plan view of the bearing assembly of FIG. 7 with an inner race removed.
Figure 9:
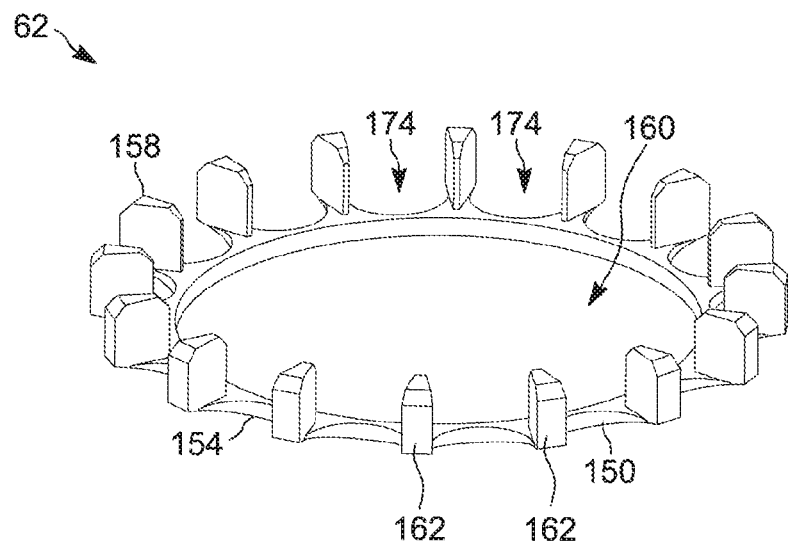
FIG. 9 is a perspective view of a ball cage.
Figure 10:
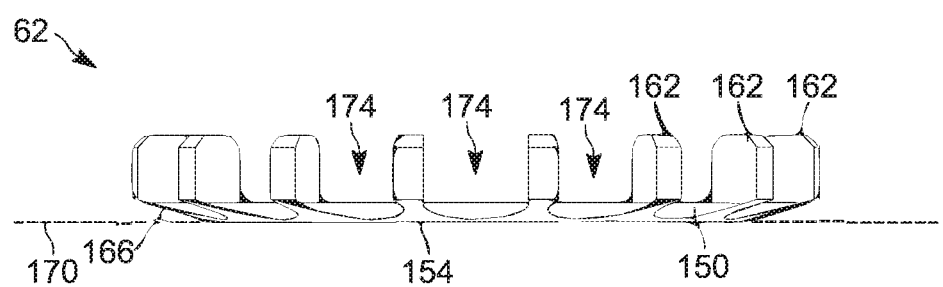
FIG. 10 is a side view of the ball cage of FIG. 9.
Figure 11:
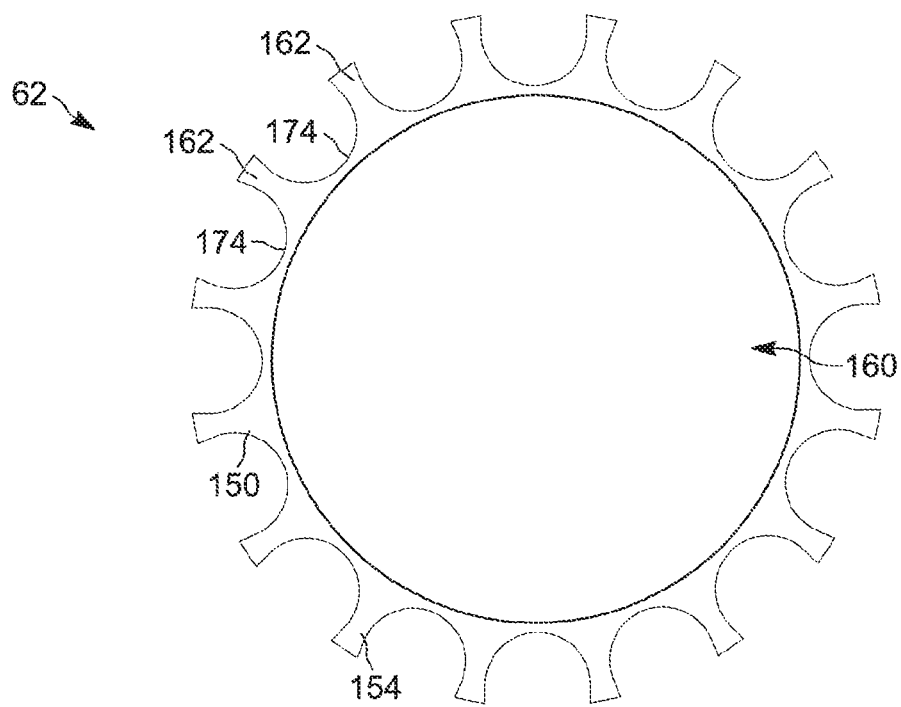
FIG. 11 is a plan view of the ball cage of FIG. 9.
Figure 13:
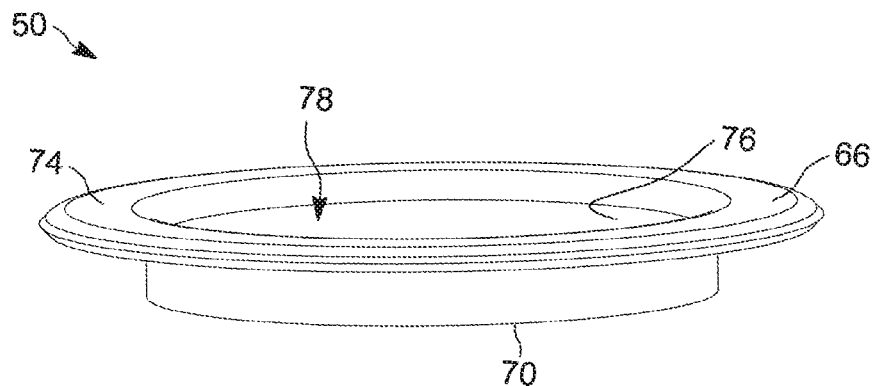
FIG. 13 is a perspective view of an inner race.
Figure 14:
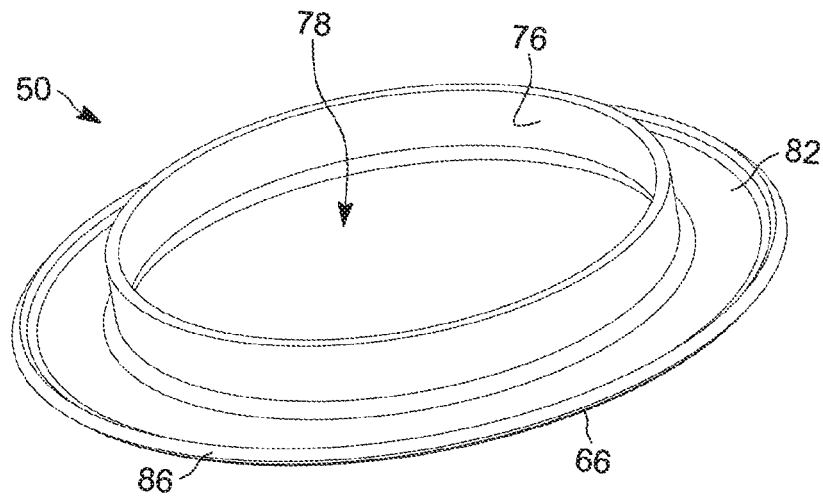
FIG. 14 is another perspective view of the inner race of FIG. 13.
Figure 15:
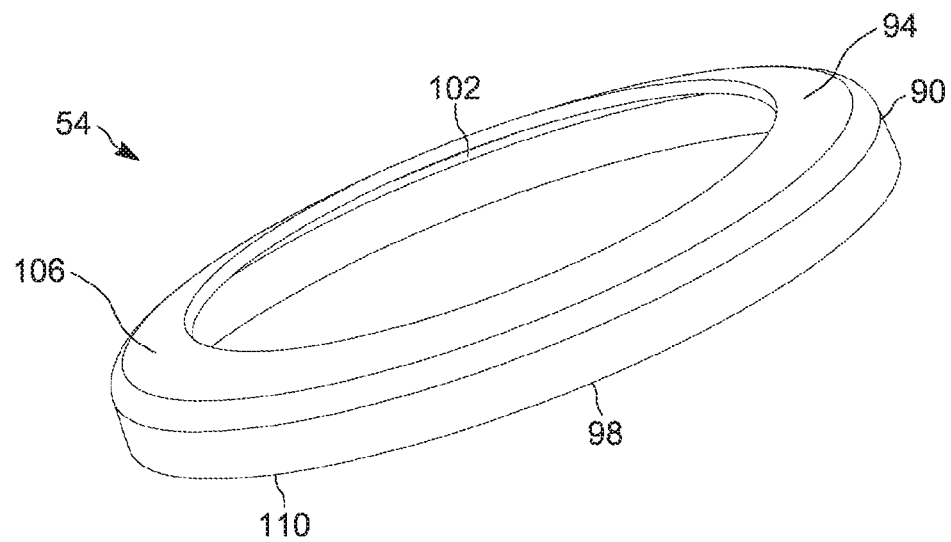
FIG. 15 is a perspective view of an outer race.
Figure 16:
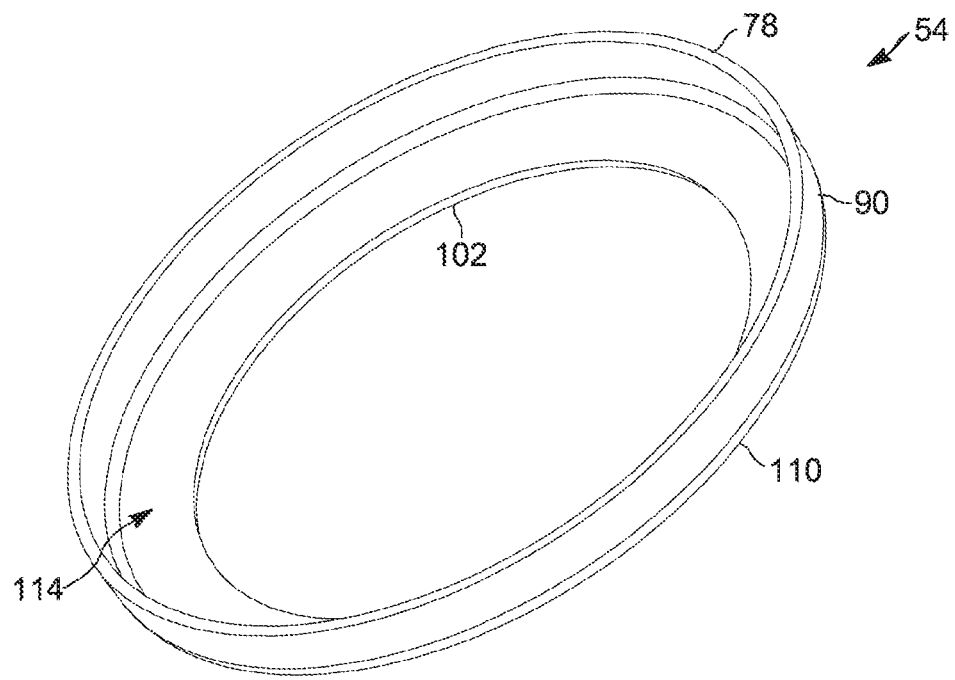
FIG. 16 is another perspective view of the outer race of FIG. 15.
Figure 17:
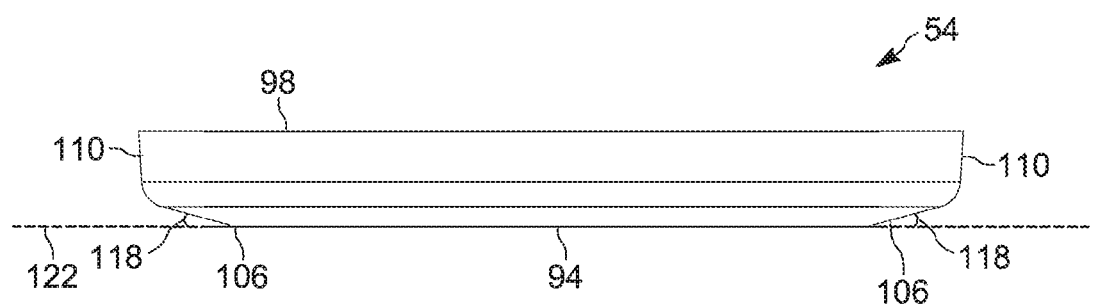
FIG. 17 is a side view of the outer race of FIG. 15.

With respect to FIGS. 5-8, the first and the second bearing assemblies 22 are identical and include an inner race 50, an outer race 54, a plurality of balls 58, and a ball cage or spacer 62. With respect to FIGS. 13-14, the inner race 50 includes a body 66 with a first side 70, a second side 74, a wall 76 that defines an aperture 78 that receives the shaft 18, and a surface 82 that extends between the wall 76 and a perimeter 86 of the body 66. The surface 82 is substantially arcuate and configured to align with the balls 58. With respect to FIGS. 15-17, the outer race 54 includes a body 90 with a first side 94, a second side 98, an aperture 102 that receives the shaft 18, a first wall 106 extending from the first side 94, and a second wall 110 extending from the first wall 106. The first and second walls 106, 110 define a recess 114 between the first side 94 and the second side 98. The first wall 106 extends at an angle 118 relative to a plane 122 of the first side 90 of the inner race 54 and the second wall 110 is substantially perpendicular to the plane 122. As shown in FIG. 6, a maximum diameter 126 of the outer race 54 is greater than a maximum diameter 130 of the inner race 50.

Figure 12:
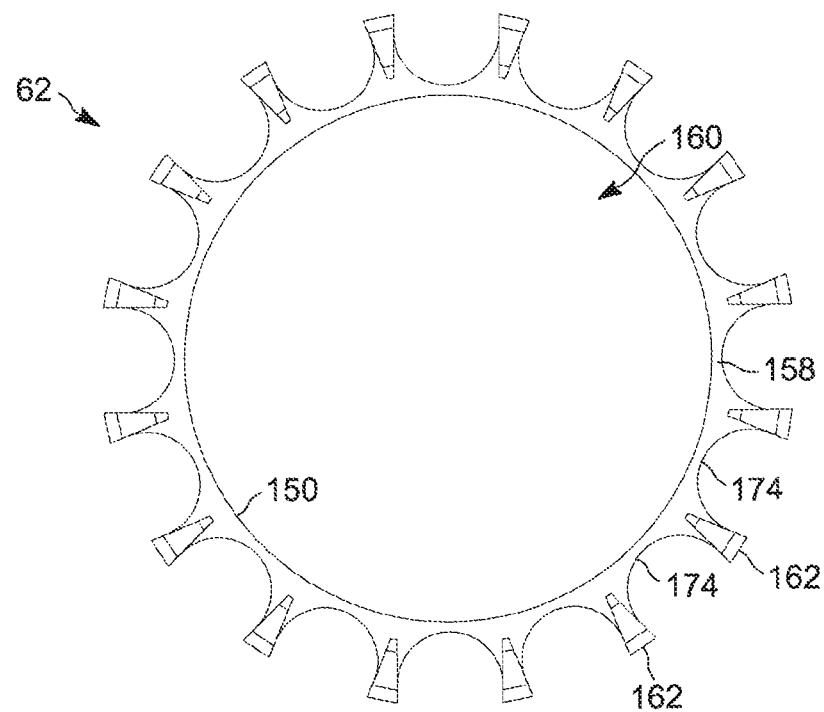
FIG. 12 is another plan view of the ball cage of FIG. 9.

With respect to FIGS. 9-12, the ball cage 62 includes a body 150 that has a first side 154, a second side 158, and an aperture 160 that receives the shaft 18. The ball cage 62 further includes a plurality of projections 162 that extend between the first side 154 and the second side 158. The projections 162 of the ball cage 62 extend at an angle 166 with respect to a plane 170 of the first side 154. The angle 166 is substantially similar to the angle 118 of the first wall 106 of the inner race 54. An opening or gap 174 is created between adjacent projections 162 such that the ball cage 62 defines a plurality of openings 174. In the illustrated embodiment, each projection 62 is polygonal. In particular, in the illustrated embodiment, when viewed along the central axis, the projections 162 are substantially wedge-shaped or trapezoidal (FIG. 12). Each opening 174 is substantially semicircular and receives one of the balls 58. In other embodiments, the projections 62 and/or openings 174 may have a different shape.

In the illustrated embodiment, the ball cage 62 includes an outer edge and an inner edge, and the openings 174 are formed along a perimeter of the outer edge. Also, each of the projections 162 extends at least partially between the outer edge and the inner edge. Each projection 162 tapers in a radial direction from the outer edge toward the inner edge, and a thickness of each projection 162 proximate the inner edge is less than a thickness of the projection 162 proximate the outer edge. In addition, in the illustrated embodiment, the first side 154 is planar, and each of the projections 162 protrudes from the first side 154 in a direction parallel to the axis of rotation A.

In the illustrated embodiment, there are sixteen openings 174 and sixteen balls 58. In other or additional embodiments, there may be fewer or more openings 174 or balls 58. Also, in some embodiments, each opening 174 has a width between about 0.26 inches and about 1.01 inches, and each ball 58 has a diameter between about 0.25 inches and about 1.00 inches. In the illustrated embodiment, the outer and inner races 50, 54 are each constructed of a stainless steel alloy (for example, a 300-series stainless steel alloy). In some embodiments, the balls 58 are constructed from stainless steel; in other embodiments, the balls may be constructed from a non-metallic or ceramic material. Further, in the illustrated embodiment, the ball cage 62 is constructed from a material that is both corrosion resistant and gall-resistant, including but not limited to brass, plastic, or another material.

When assembled, the shaft 18 extends through the bearing housing 14. The first and second bearing assemblies 22 are positioned on opposite sides of the bearing housing 14. Each of the outer races 54 is positioned in and coupled to (i.e., by being press-fit into) a recess 200 in the bearing housing 14 (FIG. 4). More specifically, the first side 94 of each outer race 54 is received by one of the recesses 200 in the bearing housing 14 such that the recess 114 of each outer race 54 faces outward from the bearing housing 14. The respective ball cage 62 is positioned in the recess 114 of the outer race 54. In particular, the first side 154 of the ball cage 62 is positioned within the recess 114 of the outer race 54 and the projections 162 extend beyond the second side 98 of the outer race 54. Further, one ball 58 is positioned within each opening 174. The balls 58 and the ball cage 62 are positioned between the outer race 54 and inner race 50, which is coupled to the shaft 18 and movable with the shaft 18. As a result, the inner race 50 rides or rotates on the balls 58 to facilitate rotatable motion of the shaft 18.

As shown in FIG. 6, when assembled there is a slight clearance between each ball 58 and the respective opening 174 of the ball cage 62. The ball cage 62 is configured to ensure that the balls 58 remain an equal distance apart, which prevents weak spots or uneven loading in the bearing assemblies 22. Further, the potential for galling is reduced because the balls 58 do not come into contact with each other. The nut 30 and the plate 34 constrain the shaft 18 assembly axially, but the shaft 18 is rotatable within the bearing housing 14 because of the first and second bearing assemblies 22. The support block 26 is secured to the shaft 18 adjacent the plate 34.

In the illustrated embodiment, the first and the second bearing assemblies 22 are spaced apart by a distance of approximately 10 inches. In other or additional embodiments the distance between the first and second bearing assemblies 22 could be between approximately 1 inch to approximately 24 inches. The distance between the first and second bearing assemblies 22 along the shaft 18 is increased to reduce the needed performance of each single bearing under cantilever loading. Further, the distance between the first and the second bearing assemblies 22 is important because it allows the stainless steel components to perform the required duties without sustaining damage that might render the switch inoperable.

Although aspects have been described in detail with reference to certain preferred embodiments, variations and modifications exist within the scope and spirit of one or more independent aspects as described. Various features and advantages are set forth in the following claims.

What is claimed is:

1. A high-voltage electric switch comprising:
   a first electrical terminal configured to be supported on a frame member;
   a second electrical terminal configured to be supported on the frame member;
   a conducting member for providing electrical communication between the first electrical terminal and the second electrical terminal; and
   a shaft assembly supporting one of the first electrical terminal and the second electrical terminal for pivoting movement to move the conducting member between a first position and a second position, the conducting member providing electrical communication between the first electrical terminal and the second electrical terminal while the conducting member is in the first position, electrical communication between the first electrical terminal and the second electrical terminal being interrupted while the conducting member is in the second position, the shaft assembly including a housing, a shaft extending at least partially through the housing and coupled to the one of the first electrical terminal and the second electrical terminal, and a pair of bearing assemblies supporting rotation of the shaft relative to the housing, each of the bearing assemblies including,
   an inner race coupled to the shaft;
   an outer race;
   a cage including a planar body having a first side, an opposite second side, an outer radial edge, an inner radial edge, and a plurality of openings, the cage further including a plurality of projections protruding from the first side of the planar body, each of the plurality of projections including an inner end and an outer end disposed radially outwardly from the inner end, and each inner end being spaced apart radially outwardly from the inner radial edge, each of the plurality of openings positioned between adjacent projections and positioned along the outer radial edge and spaced apart from the inner radial edge, each of the plurality of openings includes an inner opening edge disposed radially within the outer radial edge and radially outward from the inner radial edge, wherein the outer radial edge and each inner opening edge at least partially form an outermost perimeter of the planar body, the cage positioned between the inner race and the outer race; and
   a plurality of balls, each of the plurality of balls being received in an associated one of the plurality of openings, the plurality of balls positioned between the inner race and the outer race.

2. The high-voltage electric switch of claim 1, wherein each of the projections tapering in a radial direction from the outer end toward the inner end, and wherein the outer end has a larger angular distance than the inner end.

3. The high-voltage electric switch of claim 1, wherein the inner race and outer race are constructed from a stainless steel alloy and the balls are constructed from stainless steel.

4. The high-voltage electric switch of claim 1, wherein the body of the cage has a planar surface, each of the projections protruding from the planar surface in a direction parallel to an axis of rotation of the inner race.

5. The high-voltage electric switch of claim 1, wherein the outer race has a body and a recess defined in the body, the cage being positionable within the recess such that the projections and the balls extend beyond an edge of the body of the outer race.

6. The high-voltage electric switch of claim 1, further comprising a nut that is positioned adjacent one of the first and second bearing assemblies, a plate that is positioned adjacent the other of the first and second bearing assemblies, the nut and the plate axially constrain the bearing assembly.

7. The high-voltage electric switch of claim 1, wherein a thickness of the planar body between the first side and the second side is less than a distance between the outer radial edge and the inner radial edge of the planar body.

8. The high-voltage electric switch of claim 1, wherein the plurality of projections protrude from the first side, and wherein the plurality of openings are formed through the first side and the second side.

9. The high-voltage electric switch of claim 1, wherein each opening of the plurality of openings forms a convex shape as viewed in the radial direction, and wherein the plurality of projections extend from the first side in a direction perpendicular to the radial direction.

10. A high-voltage electric switch comprising:
    a first electrical terminal configured to be supported on a frame member;
    a second electrical terminal configured to be supported on the frame member;
    a conducting member for providing electrical communication between the first electrical terminal and the second electrical terminal; and
    a shaft assembly supporting one of the first electrical terminal and the second electrical terminal for pivoting movement to move the conducting member between a first position and a second position, the conducting member providing electrical communication between the first electrical terminal and the second electrical terminal while the conducting member is in the first position, electrical communication between the first electrical terminal and the second electrical terminal being interrupted while the conducting member is in the second position, the shaft assembly including a housing, a shaft extending at least partially through the housing and coupled to the one of the first electrical terminal and the second electrical terminal, and a pair of bearing assemblies supporting rotation of the shaft relative to the housing, each of the bearing assemblies including, an inner race coupled to the shaft;

an outer race including a body and a recess defined in the body;

a cage including a planar body having a first planar side, an opposite second side, an outer radial edge, an inner radial edge, and a plurality of openings, the first planar side extending between the outer radial edge and the inner radial edge, the cage further including a plurality of projections protruding from the first planar side of the planar body, each projection of the plurality of projections includes a width less than a width of the first planar side between adjacent openings, the cage positioned between the inner race and the outer race, a thickness of the planar body between the first planar side and the second side being less than a distance between the outer radial edge and the inner radial edge of the planar body each of the plurality of projections including an inner end and an outer end disposed radially outwardly from the inner end, and each inner end being spaced apart radially outwardly from the inner radial edge, each of the plurality of openings includes an inner opening edge disposed radially within the outer radial edge and radially outward from the inner radial edge, wherein the outer radial edge and each inner opening edge at least partially form an outermost perimeter of the planar body: and a plurality of balls, each of the plurality of balls being received in an associated one of the plurality of openings, the plurality of balls positioned between the inner race and the outer race, wherein the cage is positionable within the recess such that the projections and the balls extend beyond an axial edge of the body of the outer race.

11. The high voltage electric switch of claim 10, wherein the body has a first side, a second side, an aperture that receives the shaft, a first wall extending from the first die, and a second wall extending from the first wall, the first wall and the second wall defining the recess, the first wall extending at an angle relative to a plane of the first side.

12. The high voltage electric switch of claim 11, wherein the angle is a first angle, and wherein the cage includes an aperture that receives the shaft, the projections extending at a second angle relative to a plane of the first side of the cage, the first angle being substantially similar to the second angle.

13. The high voltage electric switch of claim 10, wherein each of the plurality of openings are formed along a perimeter of an outer radial edge of the cage.

14. The high-voltage electric switch of claim 10, each opening of the plurality of openings extends through the planar body between the first planar side and the second planar side.

15. A high-voltage electric switch comprising:

a first electrical terminal configured to be supported on a frame member;

a second electrical terminal configured to be supported on the frame member;

a conducting member for providing electrical communication between the first electrical terminal and the second electrical terminal; and a shaft assembly supporting one of the first electrical terminal and the second electrical terminal for pivoting movement to move the conducting member between a first position and a second position, the conducting member providing electrical communication between the first electrical terminal and the second electrical terminal while the conducting member is in the first position, electrical communication between the first electrical terminal and the second electrical terminal being interrupted while the conducting member is in the second position, the shaft assembly including a housing, a shaft extending at least partially through the housing and coupled to the one of the first electrical terminal and the second electrical terminal, and a pair of bearing assemblies supporting rotation of the shaft relative to the housing, each of the bearing assemblies including, an inner race coupled to the shaft;

an outer race;

a cage including a planar body having a first planar side, an opposite second side, an outer radial edge, an inner radial edge, and a plurality of openings, the first planar side extending between the outer radial edge and the inner radial edge, the cage further including a plurality of projections protruding from the first planar side of the planar body, each of the projections extends partially between the outer edge and the inner edge and includes a width less than a width of the first planar side between adjacent openings, a thickness at the inner radial edge of each projection being less than a thickness at the outer radial edge, the cage positioned between the inner race and the outer race each of the plurality of projections including an inner end and an outer end disposed radially outwardly from the inner end, and each inner end being spaced apart radially outwardly from the inner radial edge, each of the plurality of openings includes an inner opening edge disposed radially within the outer radial edge and radially outward from the inner radial edge, wherein the outer radial edge and each inner opening edge at least partially form an outermost perimeter of the planar body; and a plurality of balls, each of the plurality of balls being received in an associated one of the plurality of openings, the plurality of balls positioned between the inner race and the outer race.

16. The high-voltage electric switch of claim 15, wherein each of the projections is wedge-shaped.

17. The high-voltage electric switch of claim 15, wherein each of the projections tapers in a radial direction from the outer radial edge toward the inner radial edge, and wherein an outer projection edge extends a greater angular distance than an inner projection edge.

18. The high voltage electric switch of claim 15, wherein each of the plurality of openings are formed along a perimeter of the outer radial edge of the cage and is substantially semicircular.

19. The high-voltage electric switch of claim 15, each opening of the plurality of openings extends through the planar body between the first planar side and the second planar side.

20. The high-voltage electric switch of claim 15, wherein each opening of the plurality of openings forms a convex shape as viewed in the radial direction, and wherein the plurality of projections extend from the first side in a direction perpendicular to the radial direction.

* * * * *